United States Patent
Usami

(10) Patent No.: US 10,243,475 B2
(45) Date of Patent: *Mar. 26, 2019

(54) POWER CONVERSION DEVICE AND METHOD OF OPERATING A POWER CONVERSION DEVICE

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/662,202

(22) Filed: Jul. 27, 2017

(65) Prior Publication Data

US 2017/0324338 A1 Nov. 9, 2017

Related U.S. Application Data

(63) Continuation of application No. 14/521,543, filed on Oct. 23, 2014, now Pat. No. 9,722,500.

(30) Foreign Application Priority Data

Oct. 23, 2013 (JP) ................................. 2013-219706

(51) Int. Cl.
*H02M 3/337* (2006.01)
*H02M 1/12* (2006.01)
*H02M 1/42* (2007.01)
*G05F 1/565* (2006.01)
(Continued)

(52) U.S. Cl.
CPC .......... *H02M 3/337* (2013.01); *H02M 1/126* (2013.01); *H02M 1/4258* (2013.01); *G05F 1/565* (2013.01);
(Continued)

(58) Field of Classification Search
CPC ..... G05F 1/565; H02M 1/126; H02M 1/4266; H02M 7/1626; H02M 2007/4815
(Continued)

(56) References Cited

U.S. PATENT DOCUMENTS 4,823,249 A * 4/1989 Garcia, II ............... H02M 1/44
363/126
7,098,558 B2 * 8/2006 Okuma .................... H02J 9/062
307/66

(Continued)

FOREIGN PATENT DOCUMENTS

| JP | 2006-021903 A | 1/2006 |
|---|---|---|
| JP | 2014-039418 A | 2/2014 |
| JP | 5523508 B2 | 6/2014 |

*Primary Examiner* — Gary A Nash
(74) *Attorney, Agent, or Firm* — Kim & Stewart LLP

(57) ABSTRACT

A power conversion device includes a low-pass filter, a second inductor, a first switch, a third switch, a second capacitor, and a controller. The low-pass filter is configured for direct coupling to an alternating current power source. The first switch is connected in series with a second switch, a first connection point. The third switch is connected in series with a fourth switch, a second connection point. The second capacitor is coupled to the first switch, the second switch, the third switch, and the fourth switch. The controller turns on and off the first, the second, the third, and the fourth switches based on a voltage of the alternating current power source directly coupled to the low-pass filter, a circuit current through the second inductor, a voltage across the second capacitor, and an average output voltage of the load circuit.

20 Claims, 7 Drawing Sheets

(51) Int. Cl.
*H02M 7/48* (2007.01)
*H02M 7/162* (2006.01)

(52) U.S. Cl.
CPC ........ *H02M 1/4266* (2013.01); *H02M 7/1626* (2013.01); *H02M 2007/4815* (2013.01); *Y02B 70/126* (2013.01)

(58) Field of Classification Search
USPC .... 323/241, 246, 273, 275, 300; 363/16, 17, 363/21.01, 21.02, 39, 44, 45, 47, 48, 65, 363/67, 68, 78, 79, 84–86, 88, 89, 97, 98
See application file for complete search history.

(56) References Cited

U.S. PATENT DOCUMENTS

| | | | |
|---|---|---|---|
| 2006/0152947 A1* | 7/2006 | Baker | H02M 1/4241 363/16 |
| 2012/0092909 A1* | 4/2012 | Usami | H02M 7/217 363/80 |
| 2012/0092911 A1* | 4/2012 | Usami | H02M 7/217 363/89 |
| 2012/0099356 A1* | 4/2012 | Usami | H02M 7/219 363/126 |
| 2012/0139448 A1 | 6/2012 | Chiang et al. | |
| 2012/0170324 A1* | 7/2012 | Fornage | H02M 3/337 363/17 |
| 2012/0300518 A1 | 11/2012 | Chiang et al. | |
| 2012/0307529 A1* | 12/2012 | Chiba | H02M 1/08 363/17 |
| 2013/0070500 A1* | 3/2013 | Usami | H02M 7/12 363/126 |
| 2013/0201733 A1* | 8/2013 | Divan | H02M 1/00 363/39 |
| 2013/0201742 A1 | 8/2013 | Nabeto et al. | |
| 2013/0265804 A1* | 10/2013 | Fu | H02M 3/33576 363/17 |

* cited by examiner

POWER CONVERSION DEVICE AND METHOD OF OPERATING A POWER CONVERSION DEVICE

CROSS-REFERENCE TO RELATED APPLICATIONS

This application is a continuation of U.S. patent application Ser. No. 14/521,543, filed on Oct. 23, 2014, which is based upon and claims the benefit of priority from the prior Japanese Patent Application No. 2013-219706, filed Oct. 23, 2013, the entire contents of which are incorporated herein by reference.

FIELD

Embodiments described herein relate generally to a power conversion device that converts an AC voltage obtained from an AC power source into a DC voltage and supplies power to a load.

BACKGROUND

Various methods for converting an AC voltage into a DC voltage are generally known. A first method uses a diode bridge circuit and a smoothing capacitor. The diode bridge circuit performs full-wave rectification of an alternating current obtained from an AC power source. The smoothing capacitor smoothes a direct current obtained after full-wave rectification.

According to the first method, regardless of whether the AC voltage is positive or negative, a current always flows in a series circuit of two diodes in the diode bridge circuit. In the series circuit of two diodes, a power loss occurs that corresponds to a product of the current flowing in the respective diodes and a forward voltage of each diode.

A second method interposes a power factor improving converter (PFC) between the diode bridge circuit and the smoothing capacitor. The power factor improving converter controls the current flowing in the AC power source to be sinusoidal, and controls the current to be equal to a voltage phase of the AC power source. According to the second method, power loss also occurs, since the current flows in the series circuit of the two diodes during the full-wave rectification. In addition, the current flows alternately in a field effect transistor (FET) of the PFC and the diode. Consequently, a greater power loss occurs.

The power factor improving converter has to be set so that an output voltage is higher than an input voltage, since it is necessary to set a waveform of an input current to be a sine wave. However, a voltage required by a load is not necessarily a voltage that is higher than the input voltage. In that case, a step-down converter is connected to a rear stage of the power factor improving converter. Then, the voltage stepped up by the power factor improving converter is stepped down to a desired voltage. Even during the step-down of the voltage, the power loss continues to occur. An overall power conversion device is configured to have three stages of AC-DC conversion, DC-DC (step-up) conversion, DC-DC (step-down) conversion. Power conversion efficiency is represented by the product of conversion efficiency of these stages. For example, if the efficiency per one stage is assumed to be 0.95, the efficiency in the third stage is expressed by 0.95×0.95×0.95=0.86. That is, even if the conversion is performed so that the efficiency of an individual stage is 95%, the efficiency falls to 86% over three stages. As described above, even if conversion efficiency of an individual stage is good, the conversion efficiency in the case of multiple stages can be poor.

Recently, electronic devices are required to consume less power. At the same time, it is an essential requirement not to generate current harmonic noise so that the noise does not adversely affect the external environment. For this reason, there is a need for both improved conversion efficiency of the power conversion device supplying power to a load and a current harmonic suppression function.

DETAILED DESCRIPTION

Embodiments described herein provide both improved conversion efficiency of a power conversion device supplying power to a load and a current harmonic suppression function.

A power conversion device according to an embodiment described herein includes a low-pass filter, a second inductor, a first switch, a third switch, a second capacitor, and a controller. The low-pass filter comprises a first inductor and a first capacitor, and configured for direct coupling to an alternating current power source. The second inductor is coupled between the low-pass filter and a load circuit. The first switch is connected in series with a second switch, a first connection point between the first switch and the second switch coupled to the low-pass filter. The third switch is connected in series with a fourth switch, a second connection point between the third switch and the fourth switch coupled to the load circuit. The second capacitor is coupled to the first switch, the second switch, the third switch, and the fourth switch. The controller is configured to turn on and off the first, the second, the third, and the fourth switches based on a voltage of the alternating current power source directly coupled to the low-pass filter, a circuit current through the second inductor, a voltage across the second capacitor, and an average output voltage of the load circuit.

Hereinafter, embodiments of a power conversion device will be described with reference to the drawings.

First Embodiment

Figure 1:
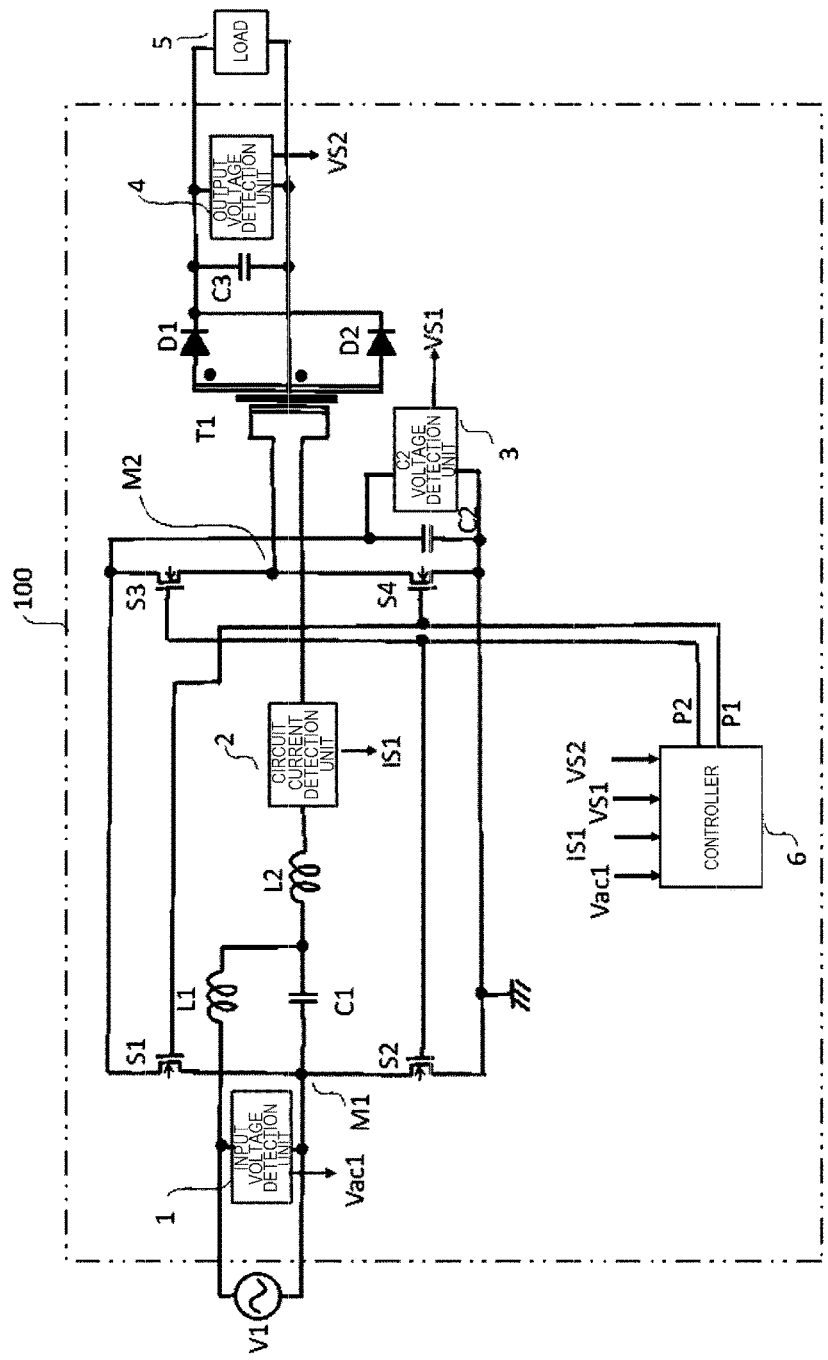
FIG. 1 is a circuit configuration diagram of a power conversion device according to a first embodiment.

FIG. 1 is a circuit configuration diagram of a power conversion device 100 according to a first embodiment. The power conversion device 100 is configured to include a main circuit unit that has first and second semiconductor switches (hereinafter, simply referred to as switches) S1 and S2, third and fourth switches S3 and S4, first and second inductors L1 and L2, first to third capacitors C1 to C3, a transformer T1, first and second diodes D1 and D2, an input voltage detection unit 1, a circuit current detection unit 2, a C2 voltage detection unit 3 (also referred to as a capacitor voltage detection unit), and an output voltage detection unit 4. The power conversion device 100 also includes a controller 6. Any one of the switches S1 to S4 employs an N-type field effect transistor (FET) (e.g., a metal-oxide FET (MOSFET)) as a switching element.

The power conversion device 100 connects a source terminal of the first switch S1 to a drain terminal of the second switch S2. The power conversion device 100 connects a source terminal of the third switch S3 to a drain terminal of the fourth switch S4. Furthermore, the power conversion device 100 connects a drain terminal of the first switch S1 to a drain terminal of the third switch S3. Similarly, the power conversion device 100 connects the source terminal of the second switch S2 and a source terminal of the fourth switch S4. In addition, the power conversion device 100 connects a series connection of the first capacitor C1, the second inductor L2, the circuit current detection unit 2, and primary winding of the transformer T1 between a connection point (M1) and a connection point M2. The connection point M1 is between the source terminal of the first switch S1 and the drain terminal of the second switch S2, and a connection point (M2) is between the source terminal of the third switch S3 and the drain terminal of the fourth switch S4.

The power conversion device 100 connects the first inductor L1 and an AC power source V1 to both ends of the first capacitor C1 in series. Furthermore, the power conversion device 100 connects the input voltage detection unit 1 to both ends of the AC power source V1.

The power conversion device 100 connects the second capacitor C2 to a portion between the source terminal of the third switch S3 and the drain terminal of the fourth switch S4. Furthermore, the power conversion device 100 connects the C2 voltage detection unit 3 to both ends of the second capacitor C2.

The power conversion device 100 connects each anode of the first diode D1 and the second diode D2 to both ends of secondary winding of the transformer T1. Furthermore, the power conversion device 100 connects cathode terminals of the first diode D1 and the second diode D2. The power conversion device 100 connects the third capacitor C3 between a connection point of the cathode terminals of the diodes D1 and D2 and a center tap of the secondary winding of the transformer T1, thereby providing a rectifying and smoothing circuit. Furthermore, the power conversion device 100 connects the output voltage detection unit 4 and a load 5 to both ends of the third capacitor C3 in parallel. In an embodiment, the winding of the transformer T1 is set so that the current flows in the first diode D1 when the current oriented in a rightward direction flows in the second inductor L2 (i.e., the second inductor L2 supplies current to the secondary winding of the transformer T1). Then, if the current flowing in the second inductor L2 is caused to flow in a leftward direction (i.e., the second inductor L2 supplies current to the first capacitor C1), the current flows in the second diode D2. As a result, the current is supplied to the third capacitor C3 alternately from the first diode D1 and the second diode D2. That is, if a circuit current in the second inductor L2 is either positive or negative, a portion of the current flows into the third capacitor C3 via the transformer T1 and is accumulated as a charge. The rectifying and smoothing circuit having the diodes D1 and D2 and the capacitor C3 is referred to as a load circuit. The load circuit is coupled to a load 5 to provide a smoothed voltage output to the load 5. The above-described embodiment is not limited to the load circuit defined herein. That is, the load circuit is a generic term for a circuit configuration that is arranged from the above-described secondary winding to the load 5 and electrically connects the secondary winding to the load 5.

The controller 6 receives as input a detection signal Vac1 of the input voltage detection unit 1, a detection signal IS1 of the circuit current detection unit 2, a detection signal VS1 of the C2 voltage detection unit 3, and a detection signal VS2 of the output voltage detection unit 4. The controller 6 performs a calculation based on the detection signals and outputs the results as signals P1 and P2. The controller 6 couples the signal P1 to a gate of the first switch S1 and a gate of the fourth switch S4. The controller 6 couples the signal P2 to a gate of the second switch S2 and a gate of the third switch S3.

The gates of first switch S1 and the fourth switch S4 are electrically connected to each other and controlled according to the signal P1. The gates of the second switch S2 and the third switch S3 are electrically connected to each other and controlled according to the signal P2.

In this circuit configuration according to the embodiment described herein, a commercial power source of 100 V (voltage) and 50 Hz (hertz) is used as an AC power source V1. It is assumed that power of 200 W (watts) is supplied to the load 5. In this case, since the voltage is 100 V, the current of 2 A (ampere) is required in order to obtain the power of 200 W. That is, if the current flowing into the AC power source V1 by way of the first inductor L1 finally reaches the current of 2 A, the power of 200 W can be supplied to the load 5.

A set of the first inductor L1 and the first capacitor C1 forms a low-pass filter, and the current flowing to the AC power source V1 by way of the first inductor L1 includes only a component of 50 Hz. In contrast, the current flowing in the first switch S1 or the second switch S2 by way of the first capacitor C1 includes a high-frequency component of 100 kHz, for example. That is, the circuit current IS1 detected by the circuit current detection unit 2 is mixed with the low-frequency component of 50 Hz and the high-frequency component of 100 kHz. Thus, the power conversion device 100 is operated by the current in which these two different frequencies are mixed with each other.

The high-frequency current of 100 kHz is obtained by alternately turning on and off a pair of the first switch S1 and the fourth switch S4 and a pair of the second switch S2 and the third switch S3. For this purpose, a pair of positive and negative sinusoidal envelopes that define a peak of the circuit current IS1 is generated. A pair of the first switch S1 and the fourth switch S4 and a pair of the second switch S2 and the third switch S3 may be alternately turned on and off at suitable timings so that orientations of the current are switched between these envelopes. This procedure will be described with reference to FIG. 2.

Figure 2:
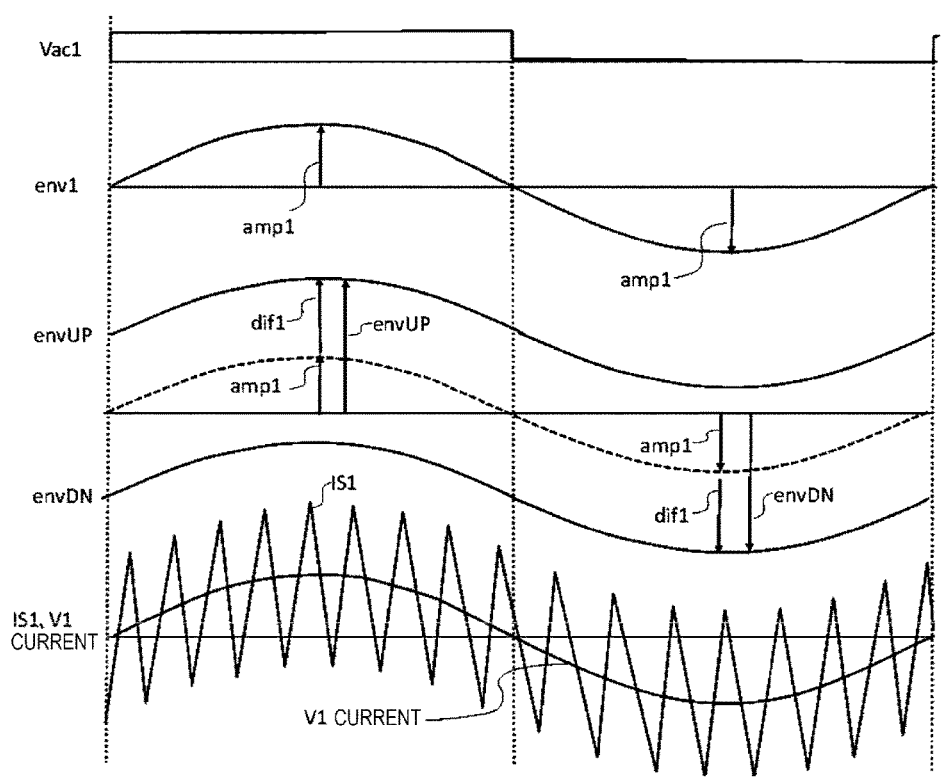
FIG. 2 is a waveform diagram used in describing an operation of a power conversion circuit of the power conversion device.

A waveform Vac1 in FIG. 2 represents a detection signal of the input voltage detection unit 1 connected to the commercial power source V1. When the voltage of the commercial power source V1 is positive, a detection signal Vac is at a level H. When the voltage of the commercial power source V1 is negative, the detection signal Vac is at a level L. Furthermore, at a zero-crossing point where the commercial power source V1 is switched over from positive to negative and at a zero-crossing point where the commercial power source V1 is switched over from negative to positive, the detection signal Vac is changed from H to L and L to H, respectively in synchronization with the zero-crossing points of the power source V1.

A waveform env1 in FIG. 2 comprises a sine wave that is generated based on the detection signal Vac, and the zero-crossing point is synchronized with the switching timing of the detection signal Vac. At this time, an amplitude amp1 of the sine wave is obtained as a result of predetermined calculation.

Waveforms envUP and envDN in FIG. 2 are obtained by adding dif1 to the sine wave env1, and by subtracting dif1 from the sine wave env1, respectively. In this manner, the sinusoidal envelopes can be generated on the positive side and the negative side, and a width between the two envelopes envUP and envDN is always constant. The value dif1 is obtained as a result of predetermined calculation.

A waveform IS1 in FIG. 2 is a detection waveform of the circuit current that is switch-controlled to reciprocate between the two envelopes envUP and envDN. An envelope value and a circuit current detection value IS1 are always compared with each other. If the circuit current detection value IS1 is out of the envelope, a state of the four switches S1 to S4 is reversed, and a slope of the current is reversed. Tf the circuit current detection value IS1 is out of the opposite side envelope, the state of the four switches S1 to S4 is reversed again. In this manner, the slope of the circuit current detection value IS1 is reversed again. Continuous high-frequency oscillations (e.g., 100 kHz) are generated by repeating the above-described procedure. The positive side envelope envUP is always in a positive region, and the negative side envelope envDN is always in a negative region. Maintaining this relationship allows the four switches S1 to S4 to be normally operated, thereby enabling an efficient oscillation operation.

The waveform of the V1 current in FIG. 2 is a waveform of the current flowing in the commercial power source V1. The waveform is obtained by extracting only the low-frequency component from the waveform of the circuit current IS1 through the low-pass filter formed by the first inductor L1 and the first capacitor C1. The low-pass filter attenuates 100 kHz, and only the low-frequency component of 50 Hz flows to the commercial power source V1 by way of the first inductor L1.

At this time, since the circuit current IS1 has a waveform that reciprocates between the two envelopes envUP and envDN, which are sine waves, an average value thereof is also a sine wave. Accordingly, the low-frequency component of 50 Hz in which the high-frequency component is removed is a sine wave, and the low-frequency component of 50 Hz flowing in the commercial power source V1 has a sinusoidal shape. The sinusoidal shape includes the low-frequency component of 50 Hz, which is a fundamental wave, and frequency components of a higher order, specifically, the components of 100 Hz, 150 Hz, 200 Hz, and so on, are extremely attenuated. This means that the input current flowing in the commercial power source V1 has extremely attenuated high-frequency components.

Figure 3:
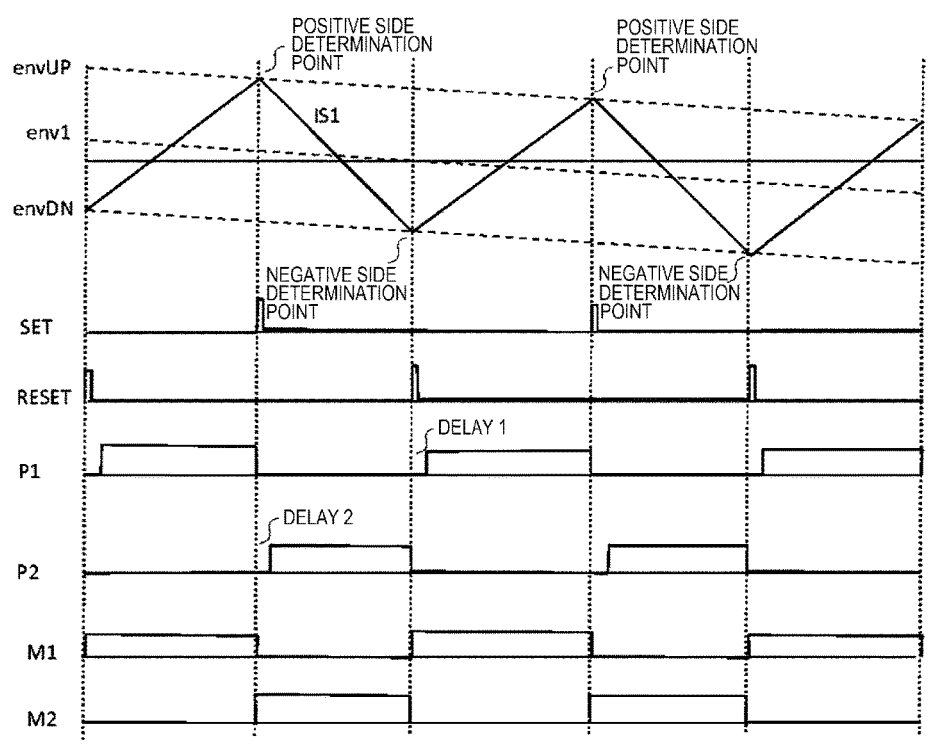
FIG. 3 is a waveform diagram used in describing a detailed operation of the power conversion circuit.

The waveform in FIG. 3 is a waveform obtained by enlarging the vicinity in which the sine wave env1 in FIG. 2 performs a zero-crossing from the positive to negative. The circuit current IS1 is configured to reciprocate within a range between the two envelopes envUP and envDN. A point where the circuit current IS1 reaches the positive side envelope envUP is set to be a positive side determination point. Similarly, a point where the circuit current IS1 reaches the negative side envelope envDN is set to be a negative side determination point. Techniques to repeatedly drive the circuit current IS1 by using the points will be described below.

A SET waveform in FIG. 3 always maintains an L-level if the circuit current IS1 is located inside the positive side envelope envUP. If the circuit current IS1 is equal to or greater than the positive side envelope envUP, an H-level is maintained. That is, the positive side determination point can be determined based on the SET signal rising from L to H.

A RESET waveform in FIG. 3 always maintains the L-level if the circuit current IS1 is located inside the negative side envelope envDN. Then, if the circuit current IS1 is equal to or greater than the negative side envelope envDN, the H-level is maintained. That is, the negative side determination point can be determined based on the RESET signal rising from L to H.

A P1 waveform in FIG. 3 is configured to rise a time interval delay 1 after the RESET waveform rises. Then, the P1 waveform is configured to fall without delay, as compared to the rise of the SET waveform.

A P2 waveform in FIG. 3 is configured to rise a time interval delay 2, as compared to the rise of the SET waveform. Then, the P2 waveform is configured to fall without delay, as compared to the rise of the RESET waveform. This repeated operation causes the P1 waveform and the P2 waveform to oscillate between the H-level and the L-level in a complementary manner. Moreover, a time interval of the delay 1 and a time interval of the delay 2 prevents the P1 waveform and the P2 waveform from being at the H-level at the same time.

Waveforms M1 and M2 in FIG. 3 represent a potential of a connection point M1 between the switches S1 and S2, and a potential of a connection point M2 between the switches S3 and S4. If the switches S1 and S4 are turned on, the current flows in a route comprising the second capacitor C2, the first switch S1, the first capacitor C1, the second inductor L2, the transformer T1, and the fourth switch S4 in this order. At this time, the potential at the connection point M1 is at the H-level, since the first switch S1 is turned on. The waveforms M1 and M2 reach the H-level later than the P1 waveform by the time interval delay 1. However, the current flows in a body diode of the first switch S1 during a time section of the time interval delay 1. That is, a reverse current flows in a route comprising the second inductor L2, the body diode of the first switch S1, and the second capacitor C2 in this order. That is, since the drain and the source of the first switch S1 are electrically connected to each other in a reverse direction, it is understood that the potential at the connection point M1 is also at the H-level even in this state. Accordingly, even if there is a time interval of the delay 1, the potential at the connection point M1 immediately reaches the H-level.

The same operation is performed with regard to the potential at the connection point M2. If the third switch S3 and the second switch S2 are turned on, the current flows in a route comprising the second capacitor C2, the third switch S3, the transformer T1, the second inductor L2, the first capacitor C1, and the second switch S2 in this order. The potential at the connection point M2 is at the H-level.

During a time interval of the delay 2, the reverse current flows in a route comprising the second inductor L2, the transformer T1, and the body diode of the third switch S3 in this order. Even in this case, the potential at the connection point M2 is at the H-level. Accordingly, even if there is the time interval of the delay 2, the potential at the midpoint M2 immediately reaches the H-level. Specifically, logic that can configure the operations described above will be described subsequently with reference to FIG. 4.

Figure 4:
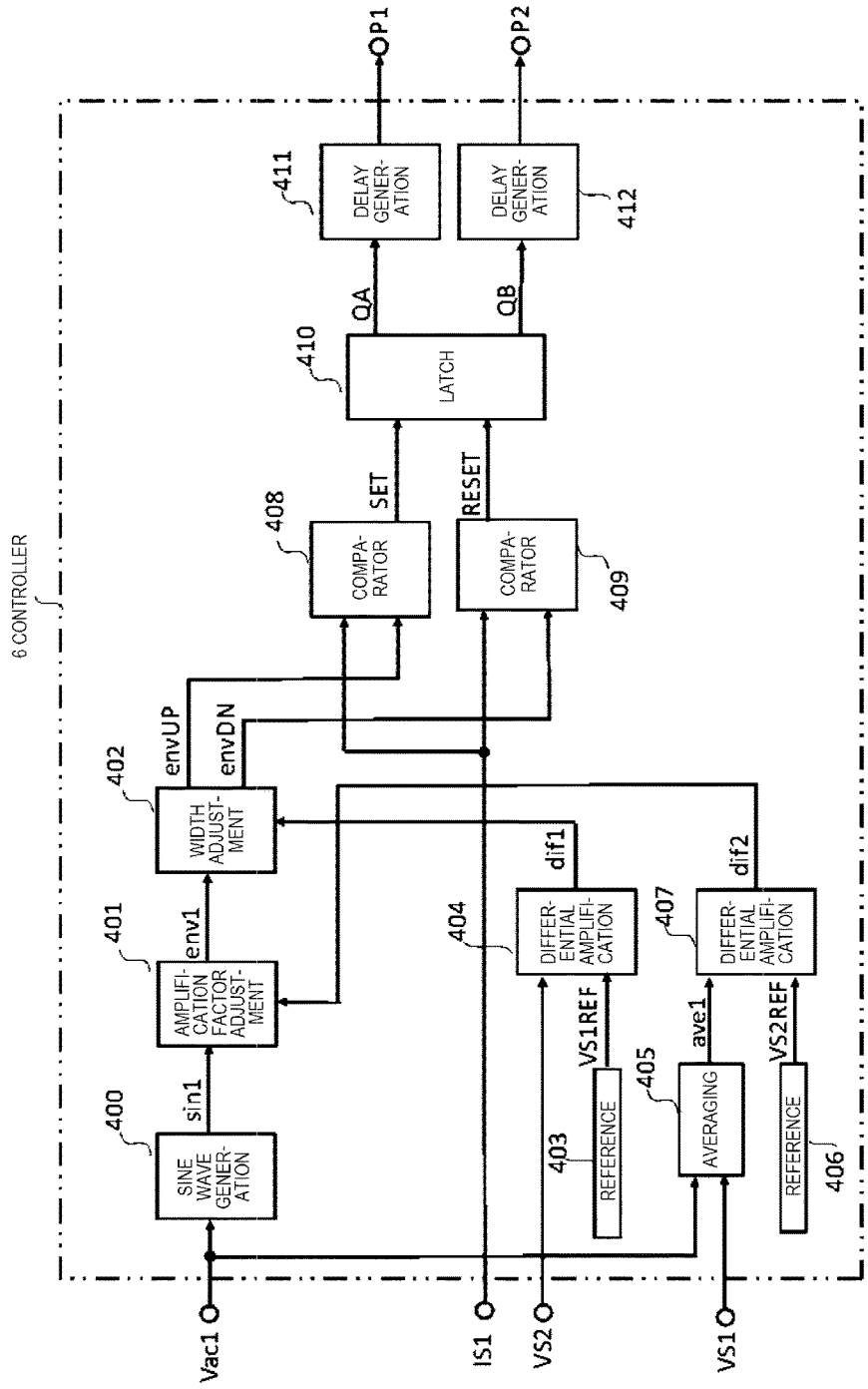
FIG. 4 is a block diagram used in describing a specific configuration of a controller of the power conversion device.

FIG. 4 is a block diagram illustrating an internal structure of the controller 6 according to an embodiment.

The controller 6 is configured to include a sine wave generation function 400, an amplification factor adjustment function 401 of the sine wave, a width adjustment function 402 of the envelope, comparators 408 and 409 that compare two values, a first delay generation function 411 and a second delay generation function 412 that generate a delay time, a latch function 410 holding a state, a differential amplification function 404 with respect to an output VS1 of the C2 voltage detection unit 3, a first reference 403 that serves as a comparison basis thereof, an averaging function 405 similarly with respect to an output VS2 of the output voltage detection unit 4, a differential amplification function 407, and a second reference 406 that serves as a comparison basis thereof.

The sine wave generation function 400 can recognize zero-crossing timing and voltage polarity of the commercial power source based on the detection signal Vac1 of the input voltage detection unit 1. The sine wave generation function 400 generates a sine wave sin1 having the same phase as the commercial power source based on the timing and the voltage polarity. For example, if the commercial power source voltage is positive, the detection signal Vac1 is at the H-level. If the commercial power source voltage is negative, the detection signal Vac1 is at the L-level. By setting the sine wave generated at the timing when the detection signal Vac1 is switched over from L to H to be sin (0°), the sine wave generation function 400 defines that the sine wave generated at the timing when the detection signal Vac1 is switched over from H to L to be sin (180°), and the sine wave generated at the timing when the detection signal Vac1 is switched over again from L to H to be sin (360°).

The amplification factor adjustment function 401 includes an amplification unit that generates an amplitude env1 suitable for a circuit operation by multiplying the sine wave sin1 generated in the sine wave generation function 400 by an appropriate amplification factor. A method of generating the amplification factor will be described below.

The width adjustment function 402 includes an envelope generation unit that generates two envelope signals by adding and subtracting a predetermined width, based on the amplitude env1 generated by the amplification factor adjustment function 401. The positive side envelope is represented by envUP in which the width is added to the amplitude env1, and the negative side envelope is represented by envDN in which the width is subtracted from the amplitude env1. A method of generating the predetermined width will be described below.

The first comparator 408 compares the positive side envelope envUP generated by the width adjustment function 402 and an output IS1 of the circuit current detection unit 2, and outputs a comparator result SET when the circuit current detection signal IS1 is greater than the positive side envelope envUP.

The second comparator 409 compares the negative side envelope envDN generated by the width adjustment function 402 and the output IS1 of the circuit current detection unit 2, and outputs a comparator result RESET when the circuit current detection signal IS1 is smaller than the positive side envelope envDN. In one embodiment, the first comparator 408 and the second comparator 409 comprise a determination unit configured to determine whether the circuit current detected by the circuit current detection unit 2 falls within a range between the positive side envelope and the negative side envelope.

The latch function 410 is a function for holding a state by inputting the output SET of the first comparator 408 and the output RESET of the second comparator 409. For example, the latch function 410 regards the signals SET and RESET as valid when the signals SET and RESET are at the H-level. If the signal SET is at the H-level, a latch output QA is held at an H-output state, and a latch output QB is held at an L-output state at the same time. If the signal SET returns to the L-level and the signal RESET is at the H-level, the latch output QA is held at the L-output state, and the latch output QB is held at the H-output state at the same time. Subsequently, if the signal RESET returns to the L-level and the signal SET is at the H-level, the latch output QA is at the H-level, and the latch output QB is at the L-level. Thereafter, this process is repeatedly performed.

The first delay generation function 411 provides a predetermined delay time with respect to the output QA of the latch function 410. For example, the first delay generation function 411 considers the signal as valid if the signal is at the H-level, and adds the predetermined delay time when the latch output QA is shifted from L to H. Conversely, when the latch output QA is shifted from H to L, the first delay generation function 411 does not add the predetermined delay time. In this manner, the signal P1 in which the delay is added to the output QA of the latch function 410 is obtained.

The second delay generation function 412 provides a predetermined delay time with respect to the output QB of the latch function 410. The second delay generation function 412 adds the predetermined delay time when the latch output QB is shifted from L to H. Conversely, when the latch output QB is shifted from H to L, the second delay generation function 412 does not add the predetermined delay time. In this manner, the signal P2 in which the delay is added to the output QB of the latch function 410 is obtained. In one embodiment, the first delay generation function 411 and the second delay generation unit 412 comprise a pulse generation unit configured to generate the pulse signals P1 and P2.

In order to obtain a desired output voltage, the first reference 403 supplies a reference value VS1REF.

The first differential amplification function 404 includes a voltage negative feedback unit that detects a difference between the output VS1REF of the first reference 403 and the output VS1 of the output voltage detection unit 4, and outputs a value thereof as dif1. The value dif1 is input to the above-described width adjustment function 402, and is used as a width applied to the output env1 of the amplification factor adjustment function 401. Specifically, the width adjustment function 402 performs the following calculation:

env$UP$=env1+dif1 env$DN$=env1−dif1.

The averaging function 405 serves to average instantaneous values with respect to the output VS1 of the C2 voltage detection unit 3. The signal VS1 is a signal indicative of the instantaneous value of the C2 voltage. The C2 voltage always varies depending on a phase of the commercial power source V1, circuit operation conditions or the like. For example, the averaging function 405 averages the values in units of cycles of the input voltage detection signal Vac1, and outputs a signal ave1.

In order to maintain the C2 voltage to be a predetermined voltage, the second reference 406 supplies a reference value VS2REF.

The second differential amplification function 407 includes a voltage negative feedback unit that outputs a difference between the output of the averaging function 405 and the output VS2REF of the second reference 406 as a signal dif2. The signal dif2 is input to the amplification factor adjustment function 401 as a function of the amplification factor. The amplification factor adjustment function 401 performs the following calculation, based on the input signal dif2. Specifically, the output env1 of the amplification factor adjustment function 401 is as follows:

$$env1=sin1\times dif2.$$

If the C2 voltage is higher than the predetermined voltage, the output VS1 of the C2 voltage detection unit 3 is greater than the value VS2REF of the second reference 406. At this time, the value of the output dif2 of the second differential amplification function 407 is set to have a value that is smaller than one. Then, since the amplification factor is smaller than one, the output env1 of the amplification factor adjustment function 401 has a value that is smaller than that of the original sine wave signal sin1. In this case, an input current decreases. As a result, power obtained from the commercial power source V1 decreases. Accordingly, the voltage of the second capacitor voltage is lowered. If the C2 voltage is lower than the predetermined voltage, a control is reversely performed. As a result, the C2 voltage is stabilized to have an approximate target value determined by the second reference 406.

According to the embodiment described above, a simple configuration enables the current having the same phase as the input voltage to flow in the commercial power source. Thus, input current harmonics can be extremely reduced. In this manner, the possibility of an adverse effect, such as burning out of transformation facilities that are externally connected to the commercial power source, or burning out of a breaker, are reduced. In addition, use of the FET as a switching element allows for low power loss. Therefore, it is possible to realize a power conversion device that is highly efficient, compact, and low-cost.

Second Embodiment

Figure 5:
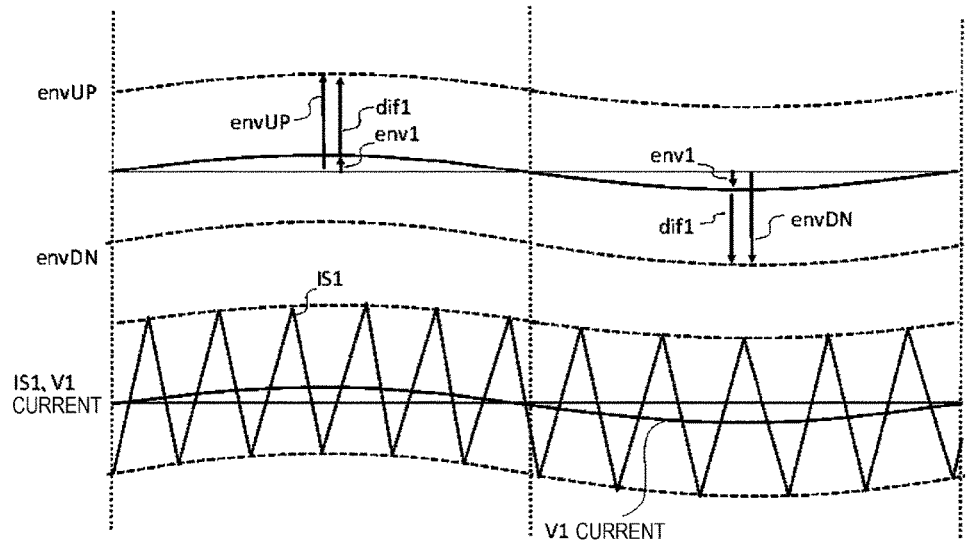
FIG. 5 is a waveform diagram used in describing an operation of a power conversion circuit according to a second embodiment.

FIG. 5 is a waveform diagram for illustrating a second embodiment. The signals env1, envUP, envDN, IS1, and the current V1 illustrated in FIG. 5 are the same as in FIG. 2, and thus, description thereof will be omitted. A different point from FIG. 2 is understood when the amplification factor of the amplification factor adjustment function 401 is lowered, that is, when the output dif2 of the second differential amplification function 407 is small. The width dif1 applied by the width adjustment function 402 is not changed from that in a case of FIG. 2.

In this case, a time section width interposed between the two envelopes envUP and envDN is the same as that in the case of FIG. 2. As a result, a cycle in which the circuit current IS1 oscillates is substantially the same. This is because the slopes of the circuit current IS1 are the same as each other in either FIG. 2 or FIG. 5, if the input voltage or the voltage of the second capacitor C2 is the same. That is, if the width dif1 is the same, the frequency hardly varies even when the amplification factor dif2 varies.

Due to the decreased amplitude env1 of the sine wave, the current having a frequency of 50 Hz that flows to the commercial power source by way of the first inductor L1 decreases, the first inductor L1 serving as the low-pass filter with respect to the circuit current IS1. The decreased input current means that the input current further decreases compared to the output current. As a result for compensating the difference, charge accumulated in the second capacitor C2 is consumed. Then, the voltage of the second capacitor C2 is lowered. This operation is effective as a control when the voltage of the second capacitor C2 is higher than the predetermined voltage.

Figure 6:
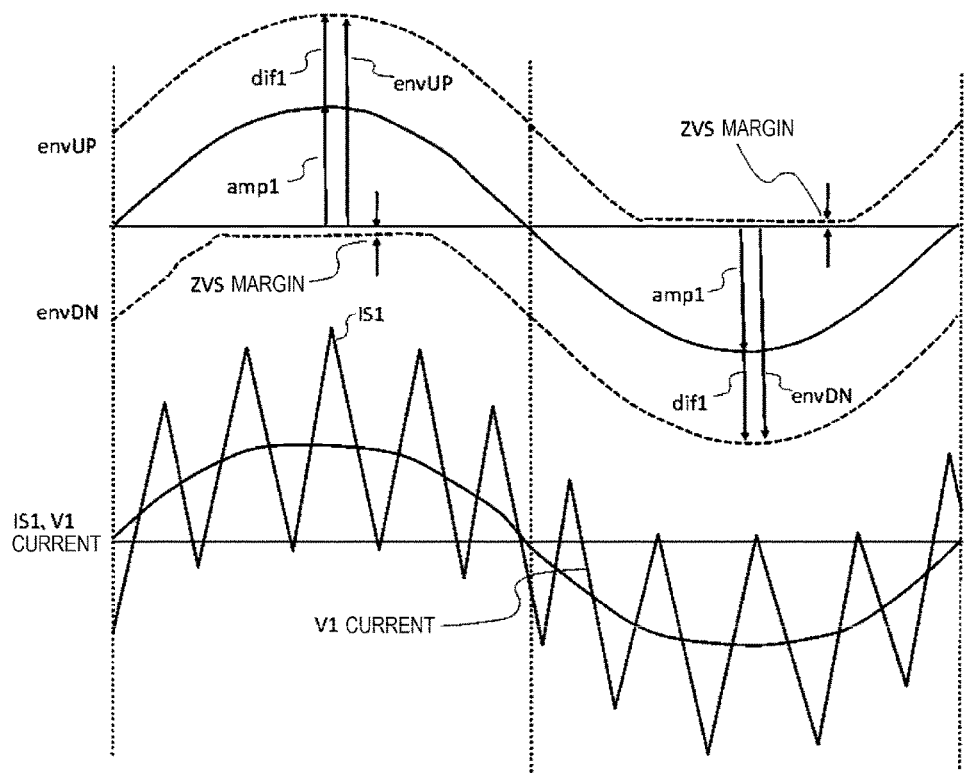
FIG. 6 is a waveform diagram used in describing an operation of the power conversion circuit of the second embodiment.

FIG. 6 is another waveform diagram for illustrating the second embodiment. FIG. 5 illustrates a case where the amplitude amp1 is further decreased compared to that of the above-described waveform in FIG. 2. However, in contrast, FIG. 6 illustrates a case where the amplitude amp1 is increased. Description for elements having the same reference numerals of the signals as those in FIG. 5 will be omitted.

If the amplitude amp1 is greater than the width dif1, the positive side envelope envUP is a target value that has to be originally present in the positive region. However, in some cases, the positive side envelope envUP steps into the negative side. Specifically, there is the following case:

$$amp1-dif1<0.$$

In this case, there may be an operation that does not satisfy switching conditions, ZVS (zero voltage switching), of the four switches S1 to S4. As a result, there is a risk that elements may suffer heat damage. In order to prevent this risk, the following ZVS margin of the positive value is provided:

$$amp1-dif1>ZVS\ margin.$$

This enables the positive side envelope envUP to be always present in the positive region. As a result, the power conversion device 100 can continuously perform a correct switching operation.

The negative side envelope envDN can also always be in the negative region by similarly providing the ZVS margin. As a result, the power conversion device 100 can continuously perform the correct switching operation. In this case, the circuit current IS1 oscillates in the same manner in FIGS. 2 and 5. If the width dif1 is the same, the oscillation frequencies are also substantially equal. However, in a portion restricted from the original sine wave by the ZVS margin, the frequencies slightly decrease, since a reciprocating distance of the circuit current IS1 is extended. In addition, a reciprocating position of the circuit current IS1 is changed due to the setting of the ZVS margin. As a result, the current of 50 Hz that flows in the commercial power source V1 has a waveform that is slightly distorted from the sine wave. However, if the ZVS margin is appropriately set, a distortion amount thereof is no longer a problem as the input current harmonics.

If the switching conditions can be appropriately maintained by providing the ZVS margin as illustrated in FIG. 6 and the amplification factor amp 1 can be increased, when the voltage of the second capacitor C2 is lower than the predetermined voltage, the input current can be increased. As a result, the voltage of the second capacitor C2 can be increased. That is, it is possible to maintain the voltage of the second capacitor C2 to be always constant by allowing the operation in FIG. 5 and the operation in FIG. 6 to be simultaneously performed. This means that a feedback control can be performed by focusing on only the voltage of the second capacitor C2, regardless of power consuming conditions of the load. Next, techniques to realize the function will be described with reference to FIG. 7.

Figure 7:
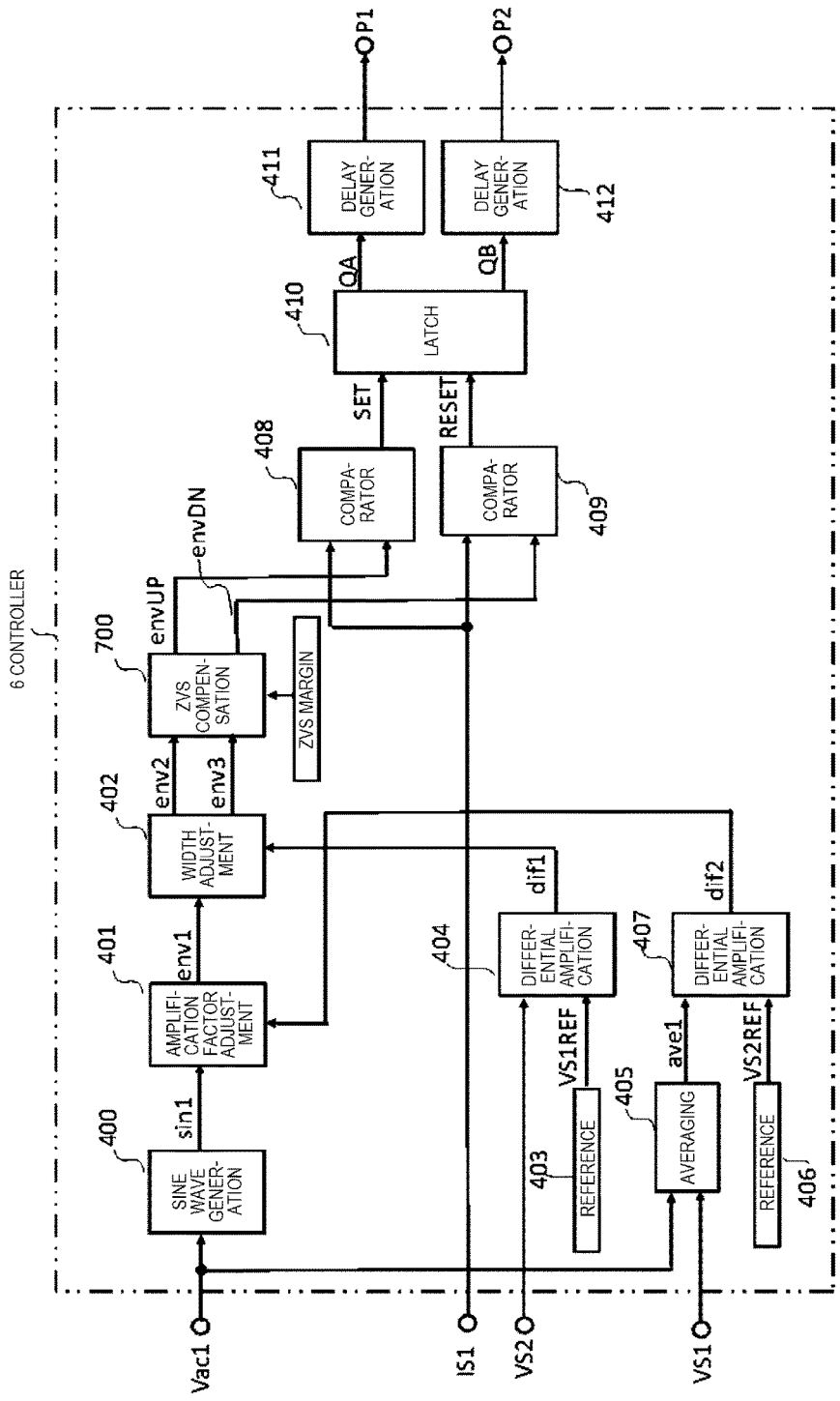
FIG. 7 is a block diagram used in describing a specific configuration of ZVS compensation according to the second embodiment and a third embodiment.

FIG. 7 is an internal block diagram of the controller 6, and is intended to realize the operation in FIG. 6 according to an embodiment. Description of the elements already described in FIG. 4 will be omitted, and only newly added functions will be described.

ZVS compensation 700 adds the ZVS margin to a positive side envelope output env2 and a negative side envelope output env3 of the width adjustment function 402 depending on respective cases. For example, if the positive side envelope output env2 is smaller than the ZVS margin, the ZVS compensation 700 substitutes a positive side envelope output value with a ZVS margin value, and outputs the value as envUP. In some embodiments, ZVS compensation 700 includes a positive side detection unit to detect whether the positive side envelope falls outside the positive region, and a positive side envelope correction unit configured to clamp the positive side envelope to zero or a positive value in response to the positive side detection unit detecting that the positive side envelope falls outside the positive region. Similarly, if the negative side envelope output env3 is located inside the ZVS margin, a negative side envelope output value is substituted with the ZVS margin value. In some embodiments, ZVS compensation 700 includes a negative side detection unit to detect whether the positive side envelope falls outside the negative region, and a negative side envelope correction unit configured to clamp the negative side envelope to zero or a negative value in response to the negative side detection unit detecting that the negative side envelope falls outside the negative region.

In this manner, the signal envUP subjected to the ZVS compensation 700 with respect to the output of the width adjustment function 402 is input to the first comparator 408, and is compared with the signal IS1. If the signal IS1 is greater than the signal envUP, the signal SET is output.

Similarly, the signal envDN subjected to the ZVS compensation 700 with respect to the output of the width adjustment function 402 is input to the second comparator 409, and is compared with the signal IS1. If the signal IS1 is located outside the signal envDN, the signal RESET is output. The subsequent operation is the same as that in FIG. 4.

By configuring the above-described functions, it is possible to realize the ZVS compensation operation using the setting of the ZVS margin illustrated in FIG. 6. FIG. 5 illustrates an operation of a case where the gain dif2 of the amplification factor adjustment function 401 is small, and FIG. 6 illustrates an operation of a case where the gain dif2 of the amplification factor adjustment function 401 is large. If the ZVS compensation 700 in FIG. 7 is added to the controller 6, the switching operation of the switches S1 to S4 of the power conversion device 100 can be correctly performed. Accordingly, it is possible to adjust an amount of the AC current flowing in the commercial power source V1 by using an efficient circuit operation that does not cause power loss. If it is assumed that an AC voltage effective value of the commercial power source V1 is constantly 100 V, it is possible to adjust the amount of the AC current flowing at that time. That is, there is provided a function for adjusting the input power based on a relationship of power=voltage× current.

According to the second embodiment, the operation of the ZVS compensation 700 enables an upper side envelope and a lower side envelope to be always held in a correct region with respect to the increased and decreased input currents. Accordingly, the power conversion device is used to suppress the loss of the FET serving as the switching element, and a variable range of the input current is widely selected. Therefore, it is possible to realize the power conversion device that is compact, highly efficient, and has a wide range of the input current. In addition, the second embodiment also has the operation effect described in the first embodiment, as a matter of course.

Third Embodiment

Figure 8:
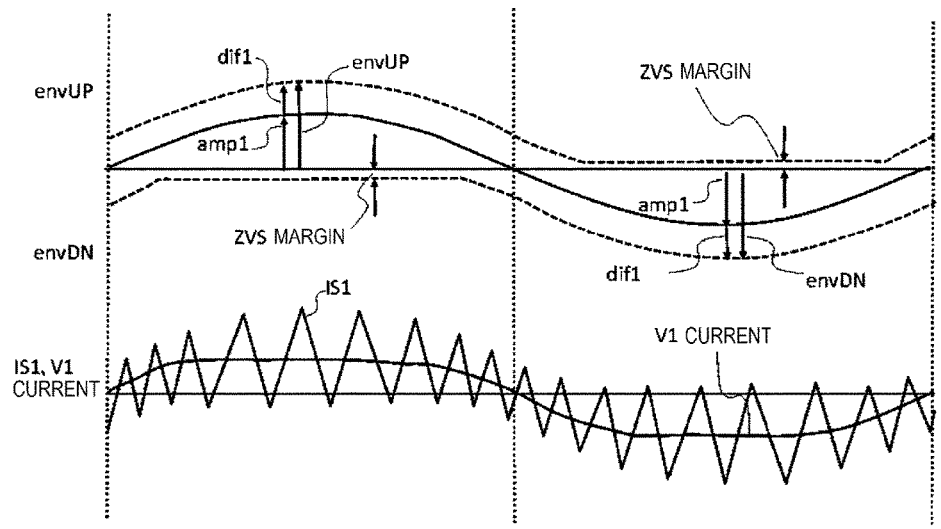
FIG. 8 is a waveform diagram used in describing an operation of a power conversion circuit according to the third embodiment.

FIG. 8 is a waveform illustrating a third embodiment. The reference numerals of the signals are the same as those in FIGS. 2 and 5, and thus, description thereof will be omitted. In the second embodiment, a case was described in which the input current can be increased and decreased when only dif2 serving as an adjustment signal of the amplification factor adjustment function 401 is increased and decreased while the value of dif1 serving as an adjustment signal of the width adjustment function 402 is fixed. Conversely, in the third embodiment, an advantageous effect when the value of dif1 serving as the adjustment signal of the width adjustment function 402 is increased and decreased while the value of dif2 serving as the adjustment signal of the amplification factor adjustment function 401 is fixed will be described.

A function for realizing the operation in FIG. 8 is provided in the controller 6 including the ZVS compensation 700 illustrated in FIG. 7. The amplification factor is maintained to be the same as that in FIG. 2. That is, the value amp1 is not changed. FIG. 8 illustrates the decreased value of the adjustment signal dif1 of the width adjustment function 402 in this state. Then, the positive side envelope envUP cannot always stay in the positive region with respect to the amplitude amp1. However, if the function of the ZVS compensation 700 in FIG. 7 is provided, the positive side envelope envUP is allowed to have the ZVS margin, and can stay in the positive region. Similarly, the negative side envelope envDN cannot also always stay in the negative region, if the width is narrow. However, the function of the ZVS compensation 700 enables the negative side envelope envDN to have the ZVS margin, and to stay in the negative region. In this case, a characteristic point of the operation is that the time for reciprocating is shortened, since the circuit current IS1 oscillates within the narrow width. As a result, the oscillation frequencies of the power conversion device 100 increase.

Figure 9:
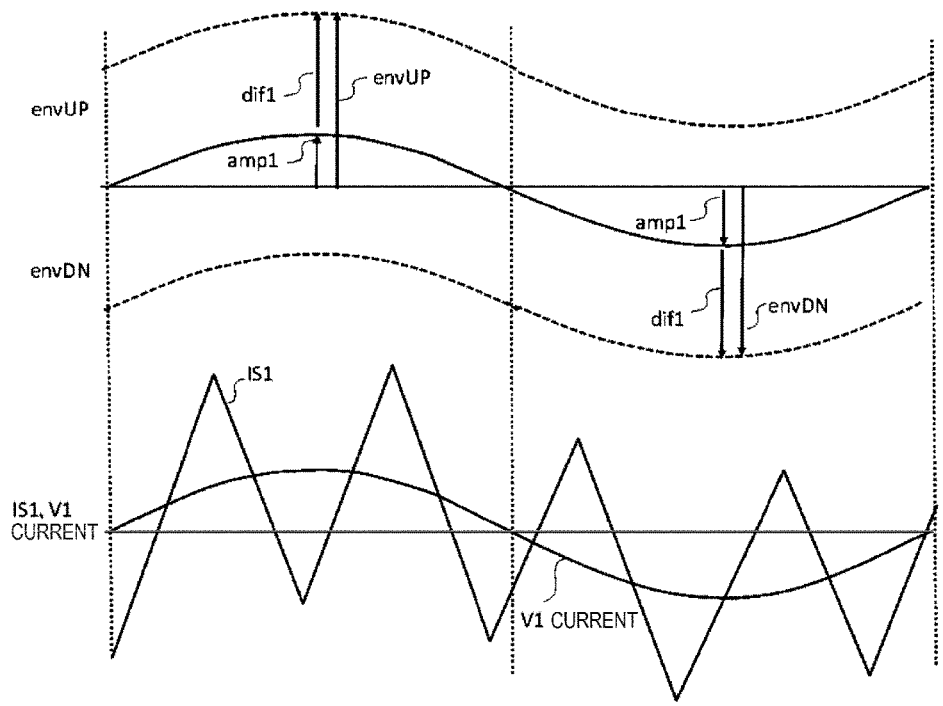
FIG. 9 is a waveform diagram used in describing an operation of the power conversion circuit of the third embodiment.

FIG. 9 is an operation waveform illustrating a case opposite to the case in FIG. 8. That is, FIG. 9 illustrates a case where the outputs env2 and env3 of the width adjustment function 402 are increased while the output env1 of the amplification factor adjustment function 401 is maintained to be the same. In this case, the outputs env2 and env3 of the width adjustment function 402 are sufficiently greater compared to the output amp1 of the amplification factor adjustment function 401. Accordingly, the ZVS compensation 700 in FIG. 7 is not particularly operated. The output env2 is output as the output envUP, and similarly, the output env3 is output as the output envDN as it is. A characteristic point in the operation illustrated in FIG. 9 is that the time for reciprocating once is lengthened, since the circuit current IS1 oscillates in a wide width. That is, the oscillation frequencies of the power conversion device 100 decrease.

As described above, the width adjustment function 402 allows the width of the envelope to be variable. In this manner, it is possible to adjust the amount of the current which is delivered to the load 5 via the transformer T1 of the power conversion device 100. For example, if the load is fixed at 100Ω (ohm), when the width of the envelope is narrow, the current flowing in the load 5 is consequently 1 A (ampere) resulting therefrom. Then, the power consumption in the load is expressed by power consumption=(square of 1 A)×100 Ω=100 W. In addition, if the width of the envelope is wide, the current flowing in the load 5 is consequently 2 A. Then, the power consumption in the load 5 is expressed by power consumption=(square of 2 A)×100 Ω=400 W.

In this case, the output voltage detection unit 4 detects the voltage generated in the load 5, and the signal VS2 thereof is fed back to the first differential amplification function 404, which compares the signal VS2 with the first reference 403. In this manner, it is possible to maintain the voltage applied to the load 5 to be constant. That is, if the detection voltage VS2 is greater than the first reference 403, the value of the output dif1 is decreased so that the output of the width adjustment function 402 is decreased. Conversely, if the detection voltage VS2 is smaller than the first reference 403, the value of the output dif1 is increased so that the output of the width adjustment function 402 is increased. It is possible to maintain the voltage applied to the load 5 to be constant by forming this control loop.

According to the third embodiment, the function of the ZVS compensation 700 enables the envelopes envUP and envDN to be always present in the correct region. In this manner, it is possible to control the power applied to the load 5 within a wide range, while driving the FET serving as the switching element with low power loss. That is, it is possible to realize the power conversion device which is compact, highly efficient, low-cost, and has a wide control range for the power applied to the load 5. The third embodiment also has the operation effect described in the first embodiment, as a matter of course.

Other Embodiments

The present invention is not limited to the above-described respective embodiments.

For example, the above-described respective embodiments adopt the AC power source V1 having a single phase. However, the AC power source V1 is not limited to the single phase. It is also possible to adopt the AC power source having multi-phases, such as three-phases or more.

In addition, the above-described respective embodiments adopt the FET (field effect transistor) as the switching element in switches S1 to S4, but the switches S1 to S4 are not limited thereto. For example, a bipolar transistor and a semiconductor element formed of IGBT, GaN, and SiC may also be used as the switches S1 to S4. Alternatively, the first switch S1 to the fourth switch S4 may be configured by combining a mechanical switch, such as a relay with a diode.

In addition, in the above-described respective embodiments, the input voltage detection unit 1 detects the zero-crossing of the commercial power source V1 as the signal Vac1, and based on the signal Vac1, the sine wave generation unit 400 generates the sine wave sin1 having the same phase as that of the commercial power source V1. However, the embodiments are not limited to this method. For example, based on the waveform of the AC voltage of the commercial power source V1, the sine wave sin1 having the same phase may be generated.

The above-described embodiments are collectively adopted, and the multiple embodiments are carried out individually or in combination. In this manner, despite the simple configuration, the AC current having fewer input current harmonics is allowed to flow in the commercial power source V1. It is possible to always operate the FET (S1 to S4) serving as the switching element in an operation mode that allows extremely low power loss. Furthermore, if the second and third embodiments are combined with each other, it is possible to broaden a variable range of the input power and a variable range of the output power. According to these characteristics, it is possible to configure the power conversion device that is compact, highly efficient, and low-cost. The power conversion device can be used as a power supply device in various fields.

In addition, several embodiments have been described. However, these embodiments have been presented as examples, and are not intended to limit the scope of the invention. A novel embodiment can be carried out in other various forms. Within a scope not departing from the spirit of the invention, the invention can be omitted, substituted, and modified in various embodiments. These embodiments or modifications are included in the scope or spirit of the invention, and are included in the scope equivalent to that of an aspect according to the invention.

What is claimed is:

1. A power conversion device, comprising:
    a low-pass filter comprising a first inductor and a first capacitor, and configured for direct coupling to an alternating current power source, the first inductor, the first capacitor, and the alternating current power source constituting a closed loop circuit;
    a second inductor coupled between the low-pass filter and a load circuit;
    a first switch connected in series with a second switch, a first connection point between the first switch and the second switch coupled to the low-pass filter;
    a third switch connected in series with a fourth switch, a second connection point between the third switch and the fourth switch coupled to the load circuit;
    a second capacitor coupled to the first switch, the second switch, the third switch, and the fourth switch; and
    a controller configured to turn on and off the first, the second, the third, and the fourth switches based on a voltage of the alternating current power source directly coupled to the low-pass filter, a circuit current through the second inductor, a voltage across the second capacitor, and an average output voltage of the load circuit.

2. The power conversion device according to claim 1, further comprising:
    a transformer including a primary winding coupled to the second connection point and a secondary winding coupled to the load circuit.

3. The power conversion device according to claim 2, wherein the load circuit comprises:
    first and second diodes having anodes terminal coupled to the secondary winding and cathode terminals coupled to each other; and
    a third capacitor coupled between the cathode terminals of the first and second diodes and a center tap of the transformer.

4. The power conversion device according to claim 3, wherein the controller comprises:
    a sine wave generation circuit configured to generate a sine wave having a phase that is the same as that of the voltage of the alternating current power source;
    an amplification circuit configured to amplify the sine wave;
    an envelope generation circuit configured to generate positive side and negative side envelopes for the sine wave as amplified;
    a determination circuit configured to determine whether the circuit current through the second inductor falls within a range between the positive side envelope and the negative side envelope; and
    a pulse generation circuit configured to generate pulse signals that control the first, the second, the third, and the fourth switches, based on output of the determination circuit.

5. The power conversion device according to claim 4, wherein the controller further includes:
- a positive side detection circuit configured to detect whether the positive side envelope falls outside a positive region;
- a positive side envelope correction circuit configured to clamp the positive side envelope to zero or a positive value in response to detecting by the positive side detection circuit that the positive side envelope falls outside the positive region;
- a negative side detection circuit configured to detect whether the negative side envelope falls outside a negative region; and
- a negative side envelope correction circuit configured to clamp the negative side envelope to zero or a negative value in response to detecting by the negative side detection circuit that the negative side envelope falls outside the negative region.

6. The power conversion device according to claim 4, wherein the controller further includes a voltage negative feedback circuit configured to adjust an output of the amplification circuit based on the voltage across the second capacitor.

7. The power conversion device according to claim 6, wherein the controller further includes an averaging circuit configured to generate an average signal from the alternating current power source voltage and the voltage across the second capacitor, wherein the voltage negative feedback circuit adjusts the output of the amplification circuit in response to the average signal.

8. The power conversion device according to claim 6, wherein the controller further includes a voltage negative feedback circuit configured to adjust an envelope width for the positive side and negative side envelopes based on the average output voltage of the load circuit.

9. The power conversion device according to claim 4, wherein the first, the second, the third, and the fourth switches each comprise a field effect transistor (FET).

10. The power conversion device according to claim 9, wherein a first pulse signal is supplied to gates of the first and fourth FETs to control the first and fourth FETs to be turned on and off in unison, and a second pulse signal is supplied to gates of the second and third FETs to control the second and third FETs to be turned on and off in unison.

11. The power conversion device according to claim 4, wherein the first, the second, the third, and the fourth switches each comprise a bipolar transistor.

12. The power conversion device of claim 4, wherein the sine wave generation circuit generates a sine wave having a phase that is the same as that of the voltage of the alternating current power source based on a zero-crossing of the alternating current power source.

13. The power conversion device of claim 4, wherein the sine wave generation circuit generates a sine wave having a phase that is the same as that of the voltage of the alternating current power source based on the waveform of the voltage of the alternating current power source.

14. The power conversion device of claim 1, wherein the alternating current power source supplies a single-phase alternating current.

15. The power conversion device of claim 1, wherein the alternating current power source supplies a polyphase alternating current.

16. A method of operating a power conversion device, comprising:
- detecting an alternating current power source voltage supplied across a first node directly coupled to a first end of a first inductor and a second node directly coupled to a first connection point between first ends of first and second switches;
- detecting a circuit current in a second inductor connected between a first capacitor and a load circuit that is coupled to first ends of third and fourth switches, the first capacitor having a first end connected to the first connection point and a second end connected to a second end of the first inductor, the third switch having a second end connected to a second end of the first switch and the fourth switch having a second end connected to a second end of the second switch;
- detecting a voltage across a second capacitor coupled between the second ends of the third and fourth switches;
- detecting an average output voltage of the load circuit;
- generating first and second pulse signals based on the alternating current power source voltage, the circuit current, the voltage across the second capacitor, and the average output voltage of the load circuit; and
- supplying the first pulse signal to the first and fourth switches and the second pulse signal to the second and third switches, wherein
- the first inductor, the first capacitor, and the alternating current power source constitute a closed loop circuit.

17. The method of claim 16, wherein the pulse signals are generated by performing the steps of:
- generating a sine wave having a phase that is the same as that of the alternating current power source voltage;
- amplifying the sine wave based on an amplification factor;
- generating positive side and negative side envelopes for the sine wave as amplified;
- comparing the circuit current to a range between the positive side envelope and the negative side envelope; and
- switching the pulse signals based on the comparison.

18. The method of claim 17, wherein the pulse signals are generated by further performing the steps of:
- clamping the positive side envelope to zero or a positive value in response to the positive side envelope falling outside a positive region; and
- clamping the negative side envelope to zero or a negative value in response to the negative side envelope falling outside a negative region.

19. The method of claim 17, wherein the amplification factor is adjusted based on the voltage across the second capacitor.

20. The method of claim 19, wherein the pulse signals are generated by further performing the step of:
- generating an average signal from the alternating current power source voltage and the voltage across the second capacitor,
- wherein the amplification factor is adjusted using the average signal.

* * * * *